(12) United States Patent
Schilling

(10) Patent No.: US 7,316,110 B2
(45) Date of Patent: Jan. 8, 2008

(54) HYDRAULIC SYSTEM FOR AN AIR CART

(75) Inventor: Robin B. Schilling, Saskatoon (CA)

(73) Assignee: CNH Canada, Ltd. (CA)

( * ) Notice: Subject to any disclaimer, the term of this patent is extended or adjusted under 35 U.S.C. 154(b) by 20 days.

(21) Appl. No.: 11/096,364

(22) Filed: Apr. 1, 2005

(65) Prior Publication Data

US 2006/0218910 A1   Oct. 5, 2006

(51) Int. Cl.
*F16D 31/02*   (2006.01)

(52) U.S. Cl. .............................. 60/327; 60/387; 60/422

(58) Field of Classification Search ................. 60/327, 60/387, 422; 239/668
See application file for complete search history.

(56) References Cited

U.S. PATENT DOCUMENTS

| | | | |
|---|---|---|---|
| 3,293,942 A | | 12/1966 | Stein et al. |
| 3,344,993 A | * | 10/1967 | Wilder et al. ............... 239/164 |
| 3,490,653 A | * | 1/1970 | Chaney et al. .............. 222/627 |
| 3,776,431 A | | 12/1973 | Riley |
| 4,098,433 A | | 7/1978 | Oligschlaeger |
| 4,120,364 A | | 10/1978 | Wooldridge |
| 4,129,258 A | | 12/1978 | Mott et al. |
| 4,212,428 A | | 7/1980 | Walker |
| 4,222,581 A | | 9/1980 | Treadwell et al. |
| 4,254,687 A | | 3/1981 | Alexander |
| 4,442,979 A | * | 4/1984 | Kupper ....................... 239/656 |
| 4,566,477 A | | 1/1986 | Barker et al. |
| 4,579,038 A | | 4/1986 | Winter |
| 4,966,066 A | | 10/1990 | Kauss et al. |
| 5,875,630 A | | 3/1999 | Walsh et al. |
| 6,000,315 A | | 12/1999 | Graham et al. |
| 6,003,455 A | | 12/1999 | Flamme et al. |
| 6,065,386 A | | 5/2000 | Rüb et al. |
| 6,068,063 A | | 5/2000 | Mayerle et al. |
| 6,170,412 B1 | | 1/2001 | Memory et al. |
| 6,260,467 B1 | | 7/2001 | Mickelson et al. |
| 6,431,050 B1 | | 8/2002 | Hausman et al. |
| 6,702,208 B1 | * | 3/2004 | Hadler et al. ............... 239/668 |
| 2003/0010196 A1 | | 1/2003 | Smith et al. |
| 2004/0244659 A1 | | 12/2004 | Mayerle et al. |

* cited by examiner

*Primary Examiner*—Igor Kershteyn
(74) *Attorney, Agent, or Firm*—Rebecca Henkel

(57) ABSTRACT

A hydraulic system is provided for an air cart towed by a tow vehicle across a field. The hydraulic system includes a first selector valve configured to selectively communicate a first flow rate regulated by a first control valve to drive a hydraulic-driven auger mechanism at the air cart. The hydraulic system also includes a second selector valve control configured to selectively communicate a second flow rate regulated by a second control valve to drive a hydraulic-driven pressure source at the air cart. The first and second selector valves and first and second control valves are located at the tow vehicle, and are connected via a common hydraulic line to a main selector valve located at the air cart. The main selector valve is connected to selectively communicate the first hydraulic fluid flow rate to a pressure source and the second hydraulic fluid flow rate to the hydraulic-driven auger mechanism.

15 Claims, 2 Drawing Sheets

HYDRAULIC SYSTEM FOR AN AIR CART

FIELD OF INVENTION

The invention relates to a hydraulic system for an agricultural implement and, more particularly, relates to a hydraulic system that employs a first selector valve and second selector configured to convey hydraulic fluid at different desired flow rates via a set of common hydraulic lines for selective loading operation and distributing operation of the air cart.

BACKGROUND OF THE INVENTION

In recent years, product delivery systems have been employed in agricultural implements to deliver seed, fertilizer and herbicides to planters and tool bars. As the size of agricultural implements continues to grow, the versatility of such implements becomes more significant. Large air carts or air seeders have become increasingly popular for planting seeds, fertilizer and other product without strict regard for the exact placement of the product.

Farm practices are becoming increasingly large, which is increasing demand for fluid power to control and drive the increased use hydraulic power on these large implements. Specifically in regard to completion of seeding and preparations, there is a demand for more hydraulic power for hydraulically-driven fans, augers, and other accessories employed on the air cart. In a known manner, the hydraulic-driven fan is used to pneumatically distribute seed/fertilizer from a supply to devices for placement in the ground. Hydraulic-driven meter rollers are employed to regulate the flow of seed/fertilizer into the air stream generated by the fan motor. Hydraulic-driven augers are employed to load seed/fertilizer to a reservoir of the air cart.

A certain known hydraulic system associated with operation of these hydraulic-driven accessories employed on the air cart includes a reservoir in fluid communication with a hydraulic pump, both located on the tow vehicle, to provide fluid power to the air cart via two sets of hydraulic supply lines: one set of lines for the hydraulically-driven fan and one set of lines for the hydraulically-driven auger. One drawback of this certain known hydraulic system is the requirement of multiple sets of hydraulic lines between the tow vehicle and the air cart.

As a marginal improvement, another certain known hydraulic system includes a common selector valve and a common flow regulator control valve in fluid communication with a single set of hydraulic supply lines to supply fluid power from the tow vehicle to the air cart. The common selector valve allows switching the supply of fluid power between a distribution mode (i.e., fan) and a loading mode (i.e., auger) of operation. However, each time when switching between the distribution and the loading modes of operation, the operator must adjust the common flow rate regulator control valve for the different desired flow rates of hydraulic fluid associated with each mode of operation.

Therefore, a need has arisen to provide a simple, reliable, durable, and efficient hydraulic system for regulation of the various hydraulic implements (e.g., auger, fan, metering rollers, etc.) associated with operation of the air cart in the conveying product in an agricultural setting or environment. Furthermore, there is a need for a hydraulic system that is operable to provide fluid power at different desired flow rates via a set of common hydraulic lines for selective distribution and loading modes of operation associated with the air cart.

SUMMARY OF THE INVENTION

The present invention provides a hydraulic system for an air cart operable to be towed by a tow vehicle across a field. The air cart is configured to generate a stream of air-entrained product for distribution across the field. The air cart includes a hydraulic-driven auger mechanism to feed a supply of product to a hopper, a hydraulic-driven product metering system to regulate the flow of product from the hopper, and a hydraulic-driven pressure source for the forced air conveyance of product supplied from the product metering system for distribution in the field.

In a preferred embodiment of the present invention, the hydraulic system includes a first selector valve configured to selectively communicate a first flow rate regulated by a first control valve to drive the hydraulic-driven auger mechanism at the air cart. The hydraulic system also includes a second selector valve control configured to selectively communicate a second flow rate regulated by a second control valve to drive the hydraulic-driven pressure source at the air cart. The first and second selector valves and first and second control valves are located at the tow vehicle, and are connected via a common hydraulic pressure line to a main selector valve located at the air cart.

The preferred hydraulic system includes a pump in fluid communication between a hydraulic reservoir and the first and second selector valves. The main selector valve is configured to selectively communicate the first flow rate of hydraulic fluid to the hydraulic-driven pressure source and to selectively communicate the second flow rate of hydraulic fluid to the hydraulic-driven auger mechanism. The hydraulic system is thus able to provide fluid power at different desired flow rates via the common hydraulic pressure line between the tow vehicle and the air cart for selective distribution and loading operations of the air cart.

The main selector valve is further configured to fluidly communicate a third flow rate of hydraulic fluid to drive a hydraulic-driven manifold lift mechanism associated with operation of the air cart. The preferred air cart further includes a hydraulic-driven meter roller assembly configured to receive a fourth flow rate of hydraulic fluid upstream of the main selector valve. The preferred hydraulic system includes a common hydraulic pressure line and a common hydraulic fluid return flow line. A first tee connector is located to fluidly connect the common hydraulic pressure line leading from the tow vehicle to the air cart. The first tee connector includes a first port connected to receive the first flow rate of hydraulic fluid from the first control valve and a second port connected to receive the second flow rate of hydraulic fluid from the second control valve. A second tee connector is connected to fluidly communicate a return flow of hydraulic fluid received from the common hydraulic return flow line to the first selector valve and the second selector valve.

The present invention also provides a hydraulic system in combination with an air cart for distributing a supply of product from a hopper in an agricultural environment. The hydraulic system includes a hydraulic pump in communication to receive a hydraulic fluid supply from a reservoir, a hydraulic-driven auger motor configured to drive an auger in conveying a supply of product to a hopper mounted on the air cart, a hydraulic-driven fan motor configured to drive a fan operable to provide a pressurized air stream for the forced conveyance of product supplied from the product metering system. The hydraulic system further includes a first control valve configured to variably regulate a first flow rate of hydraulic fluid to drive the hydraulic-driven auger mechanism, and a first selector valve configured to selectively communicate the pump with the first control valve. The hydraulic system also includes a second control valve configured to variably regulate a second flow rate of hydraulic fluid to drive the hydraulic-driven pressure source, the second flow rate different than the first flow rate, and a second selector valve configured to selectively communicate the pump with the second control valve. A common hydraulic pressure line is configured to receive and communicate the first and the second flow rates of hydraulic fluid to a main selector valve. The main selector valve is configured to selectively communicate the first flow rate of hydraulic fluid to the hydraulic-driven fan motor and to selectively communicate the second flow rate of hydraulic fluid to the hydraulic-driven auger motor.

In accordance with another aspect of the invention, a method of communicating a first flow rate of hydraulic fluid flow from a hydraulic fluid source to a hydraulic-driven fan motor and a second hydraulic flow rate to a hydraulic-driven auger motor via a common hydraulic pressure line is provided, substantially in accordance with the foregoing summary.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE INVENTION

A wide variety of implements could be employed in accordance with the invention defined by the claims. Yet, the preferred embodiments of a hydraulic system 20 in accordance with the present invention will now be described with reference to an agricultural implement.

1. General Overview

Figure 1:
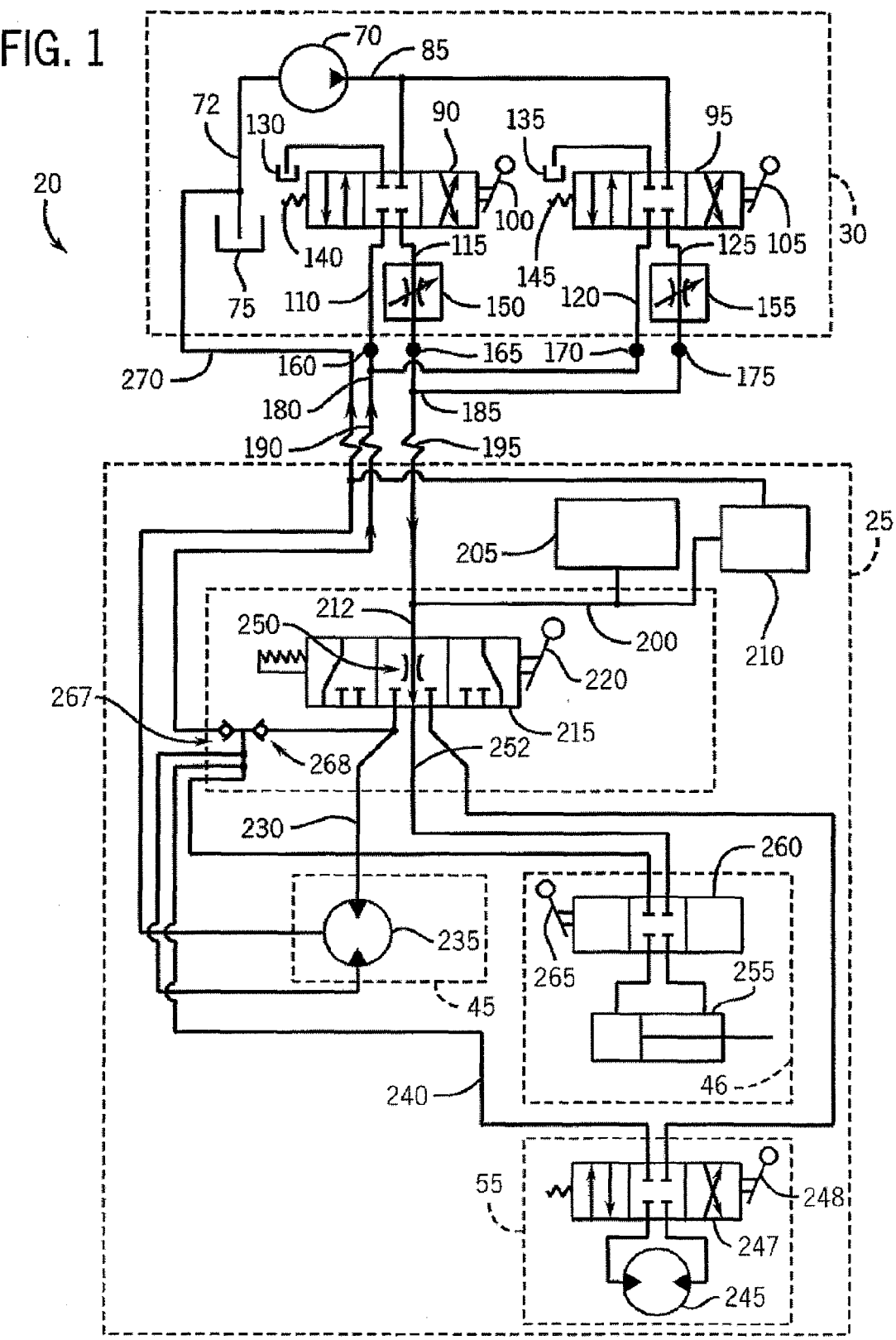
FIG. 1 schematically illustrates a hydraulic system in accordance with the present invention.
Figure 2:
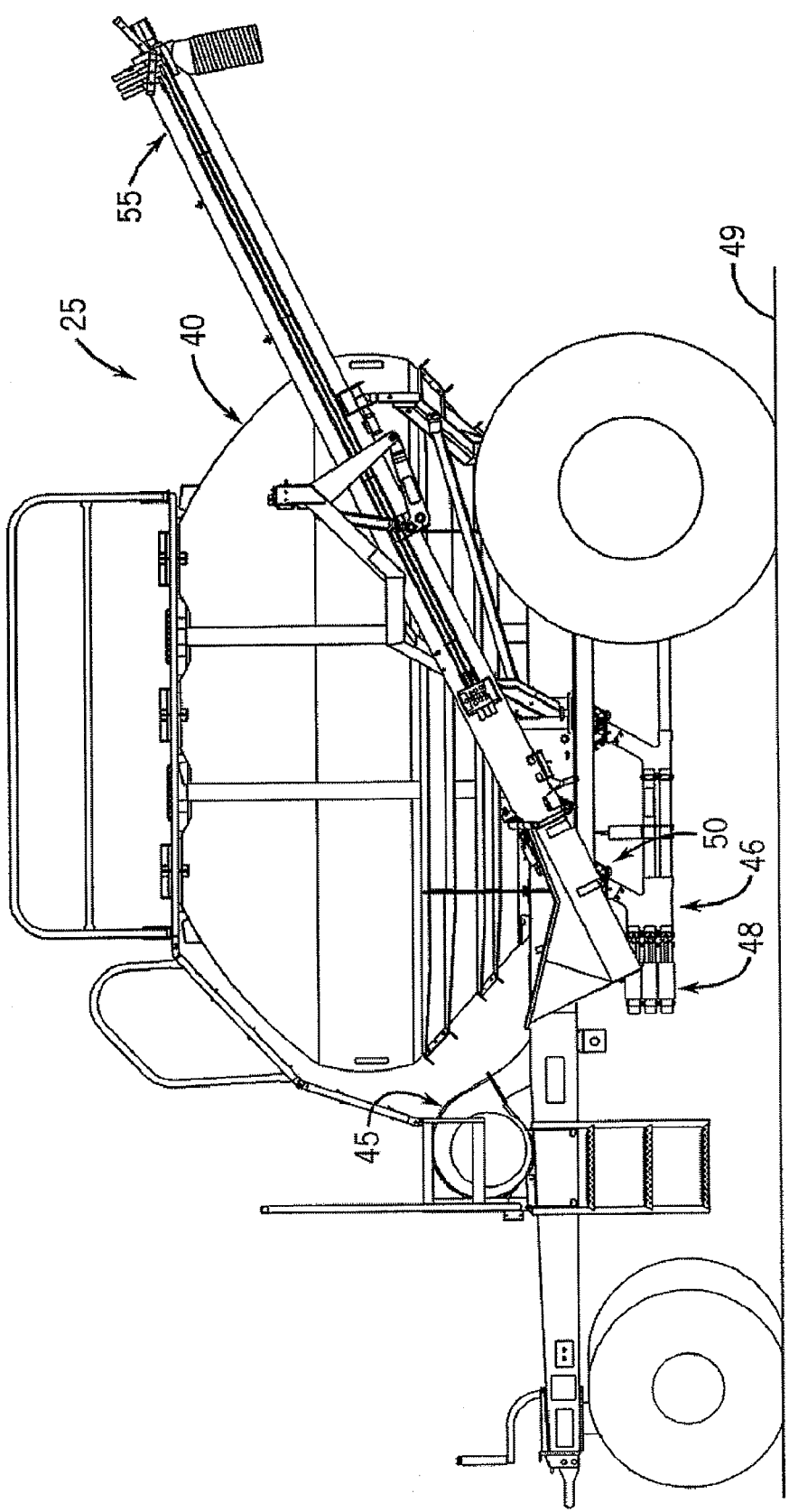
FIG. 2 schematically illustrates a known air cart employing a fan and an auger.

Referring to FIG. 2, the preferred agricultural implement shown is a conventional air cart 25. The air cart 25 is configured to be attached to a tow vehicle 30 (represented by a dashed line and reference 30 in FIG. 1), e.g., a tractor, in a conventional manner to provide power for both mobile movement of the air cart 25 over the ground and operative power for the operation of the various components of the air cart 25, as will be described in greater detail below.

Still referring to FIG. 2, the illustrated conventional air cart 25 generally includes a tank or hopper 40 (which can be multi-compartmental) having a storage capacity for product, e.g., seed, fertilizer, pesticide, herbicide, etc. The product is delivered from the tank 40 for distribution to the field via a pressurized air stream provided by a conventional pressure source 45 located on the air cart 25. The illustrated pressure source 45 is a hydraulically-driven fan operative in a known manner to provide a forced air stream to the product delivered from the tank 40 at a manifold 46. The manifold 46 communicates the air entrained product to a series of distribution lines 48 for conveyance and distribution to the field 49 in a conventional manner.

The air cart 25 also includes a conventional metering or feeder mechanism 50 operable to regulate the flow of product from the storage tank 40 into the forced air stream. The metering mechanism 50 is hydraulic-driven at a rate proportional to the ground speed of the tow vehicle 30 that in a known manner maintains a constant delivery rate of product for distribution to the ground. The metering mechanism 50 however, can be hydraulic-driven at variable speeds to vary the rate at which the product is dispensed for distribution to the field 49. The air cart 25 also includes a conventional auger 55 configured in a known manner for loading product to the tank 40.

2. The Hydraulic System

FIG. 1 illustrates the preferred embodiment of the hydraulic system 20 in accordance with the present invention that is generally configured to control and drive the various hydraulic-driven components e.g., the fan 45, the metering mechanism 50, the auger 55, etc., employed on the conventional air cart 25 illustrated in FIG. 2.

Referring to FIG. 1, the preferred hydraulic system 20 in accordance with the present invention includes a hydraulic pump 70 connected in fluid communication via a supply line 72 with a reservoir or sump or tank 75. The hydraulic pump 70 is driven in a known manner by a conventional power take-off unit (not shown) in operative connection to the engine (not shown) of the tow vehicle 30. The pump 70 has an inlet port connected with the reservoir 75 of hydraulic fluid by the hydraulic line 72 and an outlet port connected with a hydraulic pressure line 85. It will be appreciated that during the normal operation of the tow vehicle 30 over a road or field, the speed of the engine and the power take-off may vary, and thus the speed at which the pump 70 is driven may vary. However, the preferred pump 70 is adjustable in a known manner so that regardless of the speed at which it is driven, only the required volume of hydraulic fluid will be delivered to the pressure line 85. Within the limits the design capabilities of the particular pump 70, this volume is maintained regardless of the demand by the system 20. For example, with the engine running and the air cart 20 inoperative, the pump 70 will be in an idling or standby condition delivering only enough hydraulic fluid to maintain a desired preset standby pressure in the pressure line 85. The hydraulic pump 70 may be an original component of the tow vehicle 30 or an accessory pump installed on the tow vehicle 30. The hydraulic pump 70 preferably includes a pressure transducer (not shown) or like for monitoring and/or control of the pressure of the hydraulic system 20.

The type of interconnecting hydraulic line or conduit (e.g., hose, pipe, tube, etc.) employed in the hydraulic system 20 depends on the particular systems flow rates, pressures, and degree of flexing due to, for example, vibration of the air cart 25 and tow vehicle 30 or flex of the individual hydraulically-driven devices and of their support structures on the air cart.

The hydraulic pressure line 85 communicates the pressurized hydraulic fluid flow to both a first selector valve 90 and a second selector valve 95 located at the tow vehicle 30. The preferred first and second selector valves 90 and 95 are four-way spool valves located in the cab (not shown) of the tow vehicle 30. The first selector valve 90 includes a first manual selector lever or knob 100, and the second selector valve 95 includes a second manual selector lever or knob 105. The first selector lever 100 is operable to direct the pressurized fluid flow from the hydraulic pump 70 to either a first return line 110 or a first pressurized line 115. The second selector lever 105 is operable to direct the pressurized fluid flow from the hydraulic pump 70 to either a second return line 120 or a second pressurized line 125. Each selector valve 90 and 95 also provides a route to return hydraulic fluid to a drain 130 and 135, respectively. Each selector valve 90 and 95 further preferably includes several detented positions, illustrated by references 140 and 145, respectively.

The first pressurized line 115 is fluidly connected to deliver the pressurized fluid flow to a first control valve 150. The second pressurized line 125 is fluidly connected to deliver the pressurized fluid flow to a second control valve 155. Both the first and second control valves 150 and 155 are preferably at the tow vehicle 30 for ready accessibility to the operator. The first control valve 150 is designated to selectively regulate a first hydraulic flowrate to the air cart 25. The second control valve 155 is operable to regulate a second hydraulic flowrate to the air cart 25, the second hydraulic flowrate different than the first hydraulic flow rate. Although the illustrated control valves 150 and 155 are shown to be manually-operated by control levers 100 and 105, the first and second control valves 150 and 155 can also be solenoid-operated or solenoid-controlled valves or the like configured to selectively adjust a desired rate of hydraulic fluid flow.

The first return and pressure lines 110 and 115 are connected in fluid communication to quick connect couplings 160 and 165, respectively. The second return and pressure lines 120 and 125 are connected in fluid communication to quick connect couplings 170 and 175, respectively. A first tee connector 180 is fluidly connected to communicate a return hydraulic fluid flow the hydraulic couplings 160 and 170. A second tee connector 185 is fluidly connected to receive the pressurized fluid flow from the hydraulic couplings 165 and 175. The first tee connector 180 is fluidly connected to receive the return hydraulic fluid flow via a common hydraulic return line 190 from the air cart 25. The second tee connector is fluidly connected to communicate the pressurized hydraulic fluid flow via a common hydraulic pressure line 195 to the air cart 25. Thus, only two common hydraulic lines 190 and 195 are required to provide hydraulic fluid power to the air cart 25.

At the air cart 25, a first portion of the hydraulic flow from the common hydraulic pressure line 190 is communicated via a diverter line 200 to a hydraulic drive or motor 210 operable to drive the metering mechanism 50 (See FIG. 2). A pressure sensor 205 is connected in fluid communication with the diverter line 200 to monitor the pressure of the hydraulic fluid flow delivered to the air cart 25. The diverter line 200 generally maintains a constant hydraulic flow rate to the hydraulic drive 210. As a result, the hydraulic drive 210 has enough pressure to move the metering mechanism 50 regardless of the operating pressures of hydraulic fluid flow to drive either the fan 45 and/or the auger 55 (See FIG. 2). Alternatively, the metering mechanism 50 may be a liquid product feeder (e.g., a pump) driven by the hydraulic drive 210. The speed of the hydraulic motor 210 can be measured in a conventional manner (e.g., a tachometer) and controlled by a conventional actuator (e.g., a valve).

The remaining portion of the hydraulic fluid flow delivered via the common hydraulic pressure line 195 to the air cart 25 is communicated via hydraulic line 212 to the main selector valve 215. The preferred main selector valve 215 is generally a conventional four-way, three-position selector open-center directional control valve configured to selectively direct the hydraulic fluid flow in accordance to shuttling or movement of a manual adjustment lever 220. In the distribution mode of operation, the main selector lever 220 is shuttled or moved to cause the main selector valve 215 to direct hydraulic fluid flow via line 230 to drive the fan motor 235 operatively connected to drive the fan 45 (See FIG. 2). In the loading mode of operation, the selector lever 220 is shuttled or moved to cause the main selector valve 215 to direct hydraulic flow via hydraulic line 240 to drive an auger motor 245 operatively connected to drive the auger 55 (See FIG. 2). A local selector valve 247 at the auger motor 245 is fluidly connected to regulate operation of the auger 55 (See FIG. 2) via a manual adjustment lever 248.

In addition, the main selector valve 215 internally includes an open, fixed orifice 250 configured to provide a constant flow of hydraulic fluid via line 252 to selectively drive a conventional manifold lift device 255 in a known manner. A local lift selector valve 260 is fluidly connected at the lift device 255 to regulate its operation via a manual adjustment handle 265. The main selector valve 215 is configured to provide enough hydraulic flow for operation of each of the hydraulic-driven motors or drives or devices 235, 245 and 255 (See FIG. 2) on the air cart 25. The illustrated main selector valve 215 is a type suitable for local manual adjustment, but can also be configured for remote control adjustment in a conventional manner from the tow vehicle 30.

The tow vehicle 30 may include a personal computer having a microprocessor configured to generate graphic outputs, and a display unit operable to display graphic outputs on a flat screen, active matrix liquid crystal display (LCD) or cathode ray tube (CRT) associated with operation of the hydraulic system 20. The personal computer may include a full alphanumeric keyboard, or may include a means of selecting commands and set point values, increments, and decrements from a setup screen displays. The computer may further include a memory that includes data that may be read a prescription map which has been loaded offline onto the computer having geographic information system (GIS) or comparable database, into which the computer may write data in real time for later uploading offline to a remote computer. The operator station may further include a global positioning system (GPS).

In operation, the operator readily connects the quick connect couplings 160, 165, 170, and 175 to fluidly connect the air cart 25 to the tow vehicle 30. A pair of check valves 267 and 268 are fluidly connected to prevent undesired reverse operation of hydraulic components (e.g., the hydraulic driven fan motor 235) as result of the hydraulic lines 190 and 195 and/or the couplings 160, 165, 170, and 175 being mistakenly connected in reverse. The pump 70 in combination with the reservoir 75 provides a pressurized hydraulic fluid flow to the system 20. The determination of whether the fan motor or the auger motor receives the pressurized hydraulic fluid flow from the pump 70 depends on the position of the selector valves 90 and 95 at the cab of the tow vehicle 30 and the main selector valve 215 at the air cart 25. Assume for sake of example that both selector valves 90 and 95 are initially closed, and that a normal forward or positive hydraulic fluid flow through the hydraulic system 20 is desired. If the main selector valve 215 at the air cart 25 is positioned for the distribution mode of operation, the operator opens the selector valve 90 to provide the desired first hydraulic fluid flow rate in accordance to first control valve 150 via the pressure line 195 to drive the fan motor 235. If the main selector valve 215 at the air cart 25 is positioned for a loading mode of operation, the operator opens the selector valve 95 to provide the desired second flow rate of hydraulic fluid in accordance to control valve 155 via the pressure line 195 to drive the auger motor 245. The pre-selected positions of the control valves 150 and 155 provide the respective first and second flow rates of hydraulic fluid, and do not need to be adjusted each time when switching between distribution and loading modes of operation. A drain line 270 provides a return route for the hydraulic fluid to the reservoir 75 at the tow vehicle 30. Upon decoupling of the driveshaft from the pump 70, pressurization of the pressure line 85 will cease. When the air seeder is not being operated, the main selective valve 215 is not powered and automatically closes.

The various hydraulic-driven components (e.g., fan motor 235, auger motor 245, the metering assembly 205, the manifold lift device 255, etc.) on the air cart 25 are operated from one of the common hydraulic lines 190 and 195 which simplifies the hydraulic system design and reduces cost. Furthermore, the hydraulic system 20 of the invention allows the operator to deliver a first flow rate of hydraulic fluid to the fan motor 235 for the distribution mode of operation, and to deliver a second flow rate (different from the first flow rate) to the auger motor 245 for the loading mode of operation, via the set of common hydraulic lines 190 and 195, for selective loading operation and distributing operation on the air cart 25 without requiring cumbersome and time-consuming re-adjustment of the control valves 150 and 155.

In contrast, most known prior art mechanisms utilize up to three parallel motor configurations, which results in more oil flow and more hydraulic lines. Other systems require the operator to change the flow rate when switching operation of each hydraulic-driven component at the air cart.

It should be understood that the above-description is a preferred exemplary embodiment of the hydraulic system 20 of the present invention, and that the invention is not limited to the specific forms described. For example, although the illustrated conventional air cart 25 is configured to be attached to the tow vehicle 30, e.g., a tractor, in a conventional manner to provide power for both mobile movement of the air cart 25 over the ground and operative power for the operation of the components of the air cart 25, the invention is not so limited. Other types of tow vehicles and self propelled implements are equally within the scope and spirit of the invention if they include a series of hydraulic-driven accessories each of which is variable in regard to flow rate of hydraulic fluid that is normally regulated to a constant value during a field operation. In another example, the rotational metering mechanism 50 described above could be replaced by an oscillating, or a vibratory feeder and appropriate driving device. The selector valves 90 and 95 can be operated manually or by motors, compressed air, or hydraulic fluid. Metering of granular materials by varying speed of a metering mechanism 50 may be replaced or augmented by use of a hydraulic-controlled gate. The hydraulic-driven components and devices may in fact be divided into two or more assemblies or sub assemblies. Such other constructions are, nevertheless, considered within the scope of this invention.

The embodiment of the hydraulic system 20 of the invention is described above in combination with the conventional air cart 25 having the central hopper 40 and the pressure source 45. Although the above-description referred to a hydraulically driven fan 45, auger 55 and metering mechanism 50 employed by the conventional air cart 25, it is understood that the hydraulic system 20 of the present invention is adaptable incorporating other types of hydraulically driven components and devices employed on other types of agricultural implements. Furthermore, various components of the hydraulic system 20 of the invention can be constructed integrally with the air cart 25, or as a modular unit that can be conveniently coupled to the air cart 25.

Furthermore, one skilled in the art will recognize that the present invention is not limited to the conveyance of fertilizer/seed product. The present invention can be used to convey numerous types of products (e.g., seed, fertilizer, herbicides, pesticides, etc.) that exhibit suitable properties for pneumatic distribution for placement in the ground. Furthermore, the conventional air cart 25 can be provided with multiple hoppers or tanks 40 containing different types of products for application in an agricultural environment. For example, one tank could have seed product stored therein, while another tank would have fertilizer and yet another tank could have herbicides or still another reservoir of fertilizer.

Many changes and modifications could be made to the invention without departing from the spirit thereof. The scope of these changes will become apparent from the appended claims.

I claim:

1. A hydraulic system for an air cart towed by a tow vehicle across a field, the air cart including a hydraulic-driven auger mechanism to feed a supply of product to a hopper, a hydraulic-driven product metering system to regulate the flow of product from the hopper, and a hydraulic-driven pressure source operable to provide forced conveyance of product supplied from the product metering system for distribution in the field, comprising:
   a first selector valve configured to selectively communicate a hydraulic fluid flow to a first control valve;
   a second selector valve configured to selectively communicate the hydraulic fluid flow to a second control valve;
   a main selector valve; and
   a common hydraulic pressure line configured to communicate the hydraulic fluid flow from the first and second control valves to the main selector valve,
   wherein the first and second selector valves and the first and second control valves are located at the tow vehicle, and the main selector valve is located at the air cart,
   wherein the first control valve provides the hydraulic flow at a first flow rate so as to drive the hydraulic-driven pressure source at the air cart, and
   wherein the second control valve provides the hydraulic fluid flow at a second flow rate to drive the hydraulic-driven auger mechanism.

2. The hydraulic system as recited in claim 1, further comprising a first tee connector, the first tee connector including a first port connected to receive the hydraulic fluid flow from the first control valve and a second port connected to receive the hydraulic fluid flow from the second control valve, and a third port connected to fluidly communicate the hydraulic flow to the common hydraulic pressure line.

3. The hydraulic system as recited in claim 1, wherein the main selector valve is further configured to communicate the flow of hydraulic fluid received via the common hydraulic pressure line so as to drive a hydraulic-driven manifold lift mechanism mounted at the air cart.

4. The hydraulic system as recited in claim 1, wherein a hydraulic-driven meter roller assembly located at the air cart is fluidly connected to receive a portion of the flow of hydraulic fluid before reaching the main selector valve.

5. The hydraulic system as recited in claim 1, further comprising a first quick connect coupling connected to fluidly communicate the flow of hydraulic fluid from the first control valve to the common hydraulic pressure line, and further comprising a second quick connect coupling connected to fluidly communicate the flow of hydraulic fluid from the second control valve to the common hydraulic pressure line.

6. The hydraulic system as recited in claim 1, further including:
a common hydraulic return line configured to communicate a return flow of hydraulic fluid from the air cart; and
a second tee connector connected to receive the return flow of hydraulic fluid from the common hydraulic return flow line and to communicate the return flow of hydraulic fluid to the first selector valve and to the second selector valve.

7. The hydraulic system as recited in claim 6, further comprising a first quick connect coupling connected to fluidly communicate the return flow of hydraulic fluid received from the second tee connector to the first selector valve, and a second quick connect coupling connected to fluidly communicate the return flow of hydraulic fluid received from the second tee connector to the second selector valve.

8. A hydraulic system for an air cart towed by a tow vehicle across a field, comprising:
a hydraulic pump in communication to receive a hydraulic fluid supply from a reservoir;
a hydraulic-driven auger motor configured to drive an auger in conveying a supply of product to a hopper of the air cart;
a hydraulic-driven fan motor configured to drive a fan in creating a forced air stream for the forced conveyance of product supplied from the product metering system;
a first control valve configured to provide the hydraulic fluid flow at a first flow rate to drive the hydraulic-driven auger mechanism;
a first selector valve configured to selectively communicate the hydraulic fluid flow from the pump to the first control valve;
a second control valve configured to provide the hydraulic fluid at a second flow rate to drive the hydraulic-driven pressure source, the second flow rate different than the first flow rate;
a second selector valve configured to selectively communicate the hydraulic fluid flow from the pump to the second control valve;
a common hydraulic pressure line configured to receive the hydraulic fluid flow from the first and second control valves; and
a main selector valve fluidly connected to selectively communicate the hydraulic fluid flow from the common hydraulic pressure line to the hydraulic-driven pressure source and to selectively communicate the hydraulic fluid flow from the common hydraulic pressure line to the hydraulic-driven auger mechanism.

9. The hydraulic system as recited in claim 8, further including a tee connector, the tee connector including a first port connected to receive the hydraulic fluid flow from the first control valve and a second port connected to receive the hydraulic fluid from the second control valve, and a third port fluid connected to communicate the hydraulic fluid flow to the common hydraulic pressure line.

10. The hydraulic system as recited in claim 8, wherein the main selector valve is further configured to communicate the hydraulic fluid from the common hydraulic line to drive a hydraulic-driven manifold lift mechanism at the air cart.

11. The hydraulic system as recited in claim 8, further including:
a hydraulic-driven meter roller assembly operable to regulate a flow of product from the hopper of the air cart for conveyance via the forced air stream from the hydraulic-driven pressure source, wherein the hydraulic driven meter roller assembly is configured to receive a portion of the hydraulic fluid flow from the common hydraulic pressure line before reaching the main selector valve.

12. A method of communicating a hydraulic fluid flow from a reservoir at a tow vehicle to a hydraulic-driven fan motor at an air cart and to a hydraulic-driven auger motor at the air cart, the method including the steps of:
opening a first selector valve to selectively communicate the hydraulic fluid source to a first control valve;
adjusting the first control valve to provide the hydraulic flow at a first flow rate to the hydraulic driven fan motor via a common hydraulic pressure line;
closing the first selector valve;
opening a second selector valve to selectively communicate the hydraulic source with a second control valve different than the first control valve; and
adjusting the second control valve to communicate a second flow rate of hydraulic fluid via the common forward line to the hydraulic-driven auger motor.

13. The method as recited in claim 12, further comprising the step of:
receiving the first and second flow rates of hydraulic fluid at a main selector valve via the common hydraulic pressure line.

14. The method as recited in claim 13, further comprising the step of:
selectively communicating the first flow rate of hydraulic fluid via the main selector valve to the hydraulic driven fan motor.

15. The method as recited in claim 13, further comprising the step of:
selectively communicating the second flow rate of hydraulic fluid via the main selector valve to the hydraulic driven auger motor.

* * * * *